(12) United States Patent
Coughtry (10) Patent No.: US 7,278,673 B2
(45) Date of Patent: Oct. 9, 2007

(54) CONTAINER COVERING APPARATUS

(75) Inventor: Richard James Coughtry, Stuart, FL (US)

(73) Assignee: John Donovan Enterprises-Florida, Stuart, FL (US)

( * ) Notice: Subject to any disclaimer, the term of this patent is extended or adjusted under 35 U.S.C. 154(b) by 73 days.

(21) Appl. No.: 11/364,260

(22) Filed: Feb. 28, 2006

(65) Prior Publication Data

US 2006/0192407 A1  Aug. 31, 2006

Related U.S. Application Data

(60) Provisional application No. 60/656,780, filed on Feb. 28, 2005.

(51) Int. Cl.
*B60P 7/04* (2006.01)
(52) U.S. Cl. .................................................... 296/98
(58) Field of Classification Search .................. 296/98
See application file for complete search history.

(56) References Cited

U.S. PATENT DOCUMENTS

| | | | | |
|---|---|---|---|---|
| 4,834,307 A | * | 5/1989 | Larsson et al. ............. 242/245 |
| 5,129,698 A | | 7/1992 | Cohrs et al. | |
| 5,174,625 A | * | 12/1992 | Gothier et al. ................ 296/98 |
| 5,211,440 A | * | 5/1993 | Cramaro ...................... 296/98 |

* cited by examiner

*Primary Examiner*—Dennis H. Pedder
(74) *Attorney, Agent, or Firm*—Banner & Witcoff (57) ABSTRACT

Disclosed is a container covering apparatus that permits one-handed unrolling and rolling of a cover over a container. Generally, the apparatus includes a roller and a rollable cover connected to the roller. Preferably, the cover is normally biased towards the unrolled position. The apparatus further includes a crank assembly having a crankshaft, a releasable locking mechanism, and a brake. The locking mechanism is engaged when the crankshaft is rotated in a first direction. When the crankshaft is rotated in the opposing second direction, the locking mechanism is disengaged, and the operator may engage the brake. In another embodiment, a covering apparatus including a crankshaft operatively coupled to a roller mechanism is disclosed. The crankshaft handle includes an arm portion and a gripping portion. The gripping portion is moveable between a first and second position. The handle is provided with a cam mechanism that biases the gripping portion into the first or the second position when in an intermediate position.

12 Claims, 12 Drawing Sheets

CONTAINER COVERING APPARATUS

RELATED APPLICATION

This application claims priority to prior U.S. provisional application Ser. No. 60/656,780, filed Feb. 28, 2005. The entire contents of the prior provisional application are hereby incorporated by reference in their entireties.

TECHNICAL FIELD

The invention is in the field of covering apparatuses, and particularly relates to an apparatus for use in providing a cover for the cargo area of open-topped trucks and other vehicles and for storage bins.

BACKGROUND OF THE INVENTION

Open-topped cargo compartments, such as dump trucks, short vehicle trailers, storage bins and the like, are subject to having material stored therein fall or blow out. This can be particularly dangerous while the compartment is being transported. For instance, if portions of the load fall out onto a roadway (e.g., trucks or trailers hauling sand, gravel, dirt or similar materials), traffic accidents can occur, as well as damage to other vehicles and littering of the roadway. Wind effects can intensify the risk of inadvertent material loss. For instance, lightweight materials, such as plant clippings being taken to a landfill, mulch materials, or harvested plants like cotton, are susceptible to gusty winds, which may blow portions of the contents out of the vehicle or bin.

In many places, laws and regulations require the tops of such containers to be covered before they can be transported on public roadways to prevent material being blown out of the containers. Even where there are no laws regarding covering a load, it is beneficial for the driver to cover the load to reduce the possibility of damage to other property from escaping materials. Thus, tarpaulins are commonly used to cover the loads during transport. In addition, tarpaulins are often used to keep environmentally sensitive materials, such as asphalt, wheat, and the like dry and warm or cool during static storage as well as during transport.

Manually placing a tarpaulin onto an open-top container is both time-consuming and expensive. For this reason, the prior art has provided manual and automated tarpaulin covering systems. A typical manual drive system includes a tarpaulin disposed in a rolled fashion on a roller bar, and a crank box, which is disposed at a height that permits an operator to access and operate the device easily. If the roller is disposed at too great a height to be accessed directly, the covering system may include a chain drive that operatively connects the crank box and the roller bar. In such event, the crank box and roller bar typically are equipped with sprocket gears that engage a chain loop, thereby permitting the operator to roll and unroll the tarpaulin by operation of the crank box. In other embodiments, the crank box includes a crankshaft that is coaxial with the roller or that otherwise engages the roller without using a chain loop. In either case, the tarpaulin typically is normally biased towards its unrolled position, i.e., towards the position in which the tarpaulin covers the contents of the container. Often, the bias is created by way of a pair of spring-biased arms that are operatively connected to an end of the tarpaulin and that are biased towards the rear of the vehicle. The crank box may be equipped with a ratchet mechanism to lock the roller bar in position to prevent the tarpaulin from unrolling under the force of the spring-biased arms. The apparatus further may be provided with a brake system to prevent run-away opening when the ratchet mechanism is unlocked.

U.S. Pat. 5,129,698, to Cohrs at al. purports to disclose a system with lever operated locking and brake means in which the tarp cover system includes pawl and ratchet locking means for locking a tarp roll in a partially or fully rolled-up condition, in combination with dual levers. The levers are initially squeezed by one hand of the operator to release the pawl and ratchet locking means, and are subsequently pivoted by the same hand to brake the unwinding of the cover. The ratchet wheel is mounted on the crank shaft of the operating means, whereby the roller is continuously locked against inadvertent unrolling even when in a partially rolled condition.

The invention seeks to provide an improved covering apparatus. In preferred embodiments, the invention seeks to provide a covering apparatus that is operable using a single operator crankshaft handle, and that permits one-handed operation both to roll and to unroll the cover.

SUMMARY

In accordance with the invention, a covering apparatus includes a roller and a rollable cover and crankshaft for rolling and unrolling the cover. The apparatus includes a releasable locking mechanism that is operatively connected to the crankshaft and that normally impedes rotation of the roller in the unwinding direction. The locking mechanism, which preferably comprises a ratchet mechanism, is releasable upon rotation of the crankshaft in the unwinding direction. The apparatus also includes a releasable brake that is engageable upon rotation of the crankshaft in the unwinding direction, and that, when engaged, retards rotation of the roller in the unrolling direction. To open the cover, the operator turns the crankshaft in the unwinding direction, causing the roller to rotate and thereby urging the cover to retract by spooling about the roller. The locking mechanism will be engaged and will impede the unwinding of the cover. To unroll the cover, the operator turns the crankshaft in the opposite direction, thereby releasing the locking mechanism. The cover is urged towards the unrolled covering position, preferably by way of a tensioning mechanism, and thus, upon disengagement of the locking mechanism, the cover will advance by unrolling. Preferably, the apparatus is constructed such that the operator may move the crankshaft to a position in which the locking mechanism is disengaged and in which the brake is not engaged. The operator thus may permit the cover to unroll freely. By continuing to turn the handle in the unwinding direction, the operator can engage the brake and thereby retard the unrolling of the cover. Because the apparatus permits the operator to roll and unroll the cover with a single crankshaft, the device permits one-handed operation both to roll and unroll the cover.

In another embodiment, not mutually exclusive with respect to the heretofore described embodiment, a covering apparatus includes a roller and cover and crankshaft for opening the cover. The crankshaft includes a crank handle that comprises an arm portion and an operator gripping portion that is moveable with respect to the arm portion. The gripping portion is moveable between a first position that is generally parallel to said arm portion and a second position that is generally perpendicular to said arm portion. One of the arm portion and gripping portion includes a cam surface, and the other of the arm portion and gripping portion includes a follower surface. The cam surface has a cam profile that cooperates with the follower surface to bias the gripping portion towards the first position or the second position when the gripping portion is in an intermediate position.

BRIEF DESCRIPTION OF THE DRAWINGS

Other objects and advantages of the invention will become apparent from a study of the following specification when viewed in the light of the accompanying drawings, in which.

The drawings are not intended necessarily to be to scale with one another.

DETAILED DESCRIPTION OF THE PREFERRED EMBODIMENTS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Generally, the invention contemplates in some embodiments a covering apparatus, and in other embodiments a container that includes a covering apparatus as described in one or more embodiments herein. Except for the covering apparatus, the container may be conventional, and may be any truck bed, bin, trailer, cargo compartment, or the like. The invention also encompasses a vehicle that includes a container with a covering apparatus as described in one or more embodiments herein and means for transporting the container. The means for transporting the container may be any manual or motorized form of conveyance, such as a truck tractor, rail car, or the like. In preferred embodiments of the invention, the vehicle is an open-top motorized vehicular truck.

The invention contemplates in some embodiments an electric or hydraulically operated or assisted apparatus. In preferred embodiments, however, the apparatus is manually operated. Manual operation is generally preferred for reasons of simplicity and low required maintenance, and because hydraulic or electrical energy sources may not readily be available.

Figure 1:
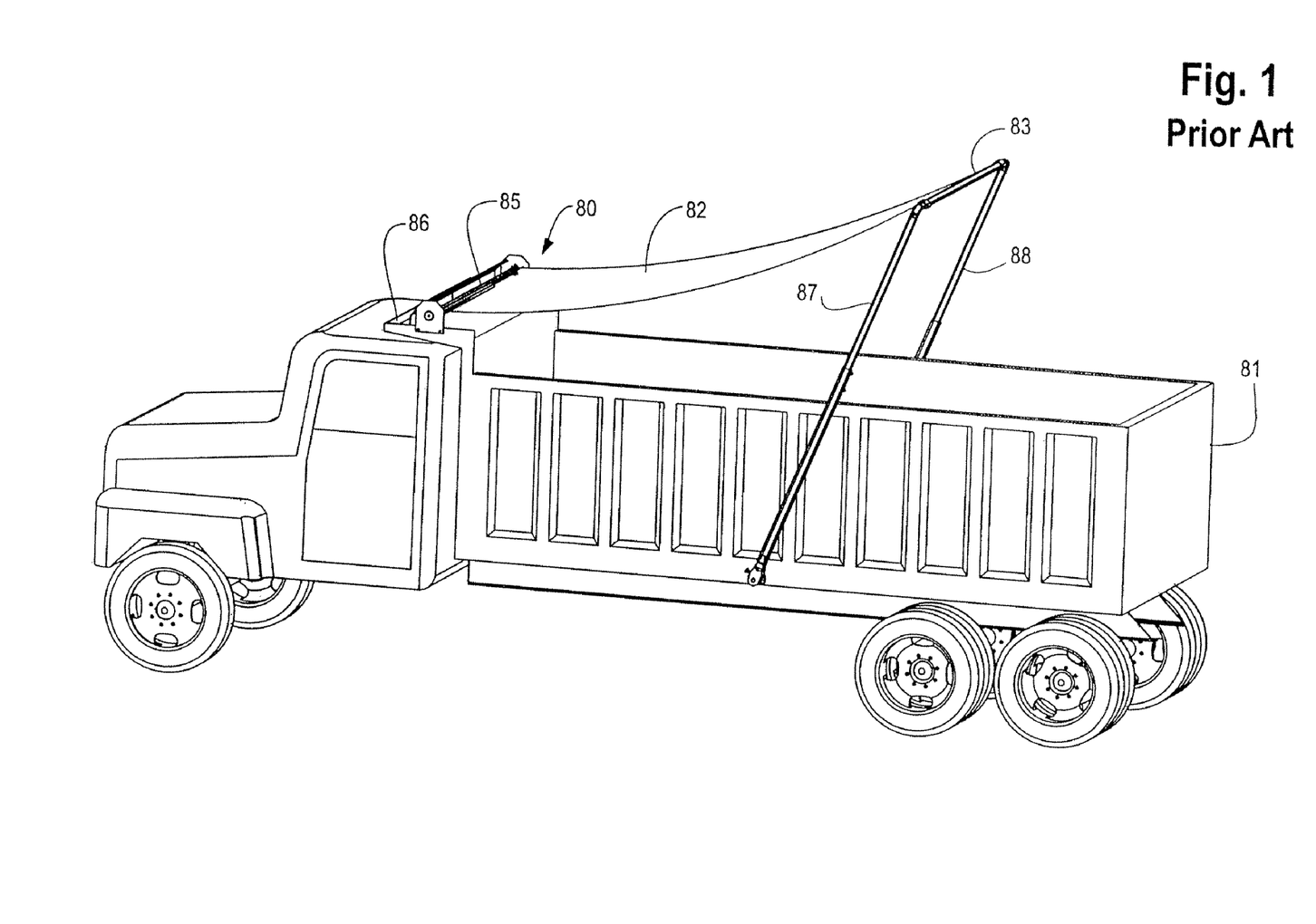
FIG. 1 is a perspective view of a conventional open-top truck with a covering apparatus.

The prior art covering system 80 shown in FIG. 1 for a cargo container 81 includes a tarpaulin cover 82 that is connected at one end to a movable cross bar 83 and on the other end to a roller 85 that is mounted in a roller housing at the top of the cab shield 86 of the container. The cross bar joins parallel arms 87 and 88 that are pivotally mounted on opposite sides of the cargo compartment. The parallel arms are spring biased towards the rear of the container, thereby urging the cover to unroll. The roller is driven via an electric, hydraulic or conventional manual mechanism (not shown) to roll and unroll the cover.

Figure 2:
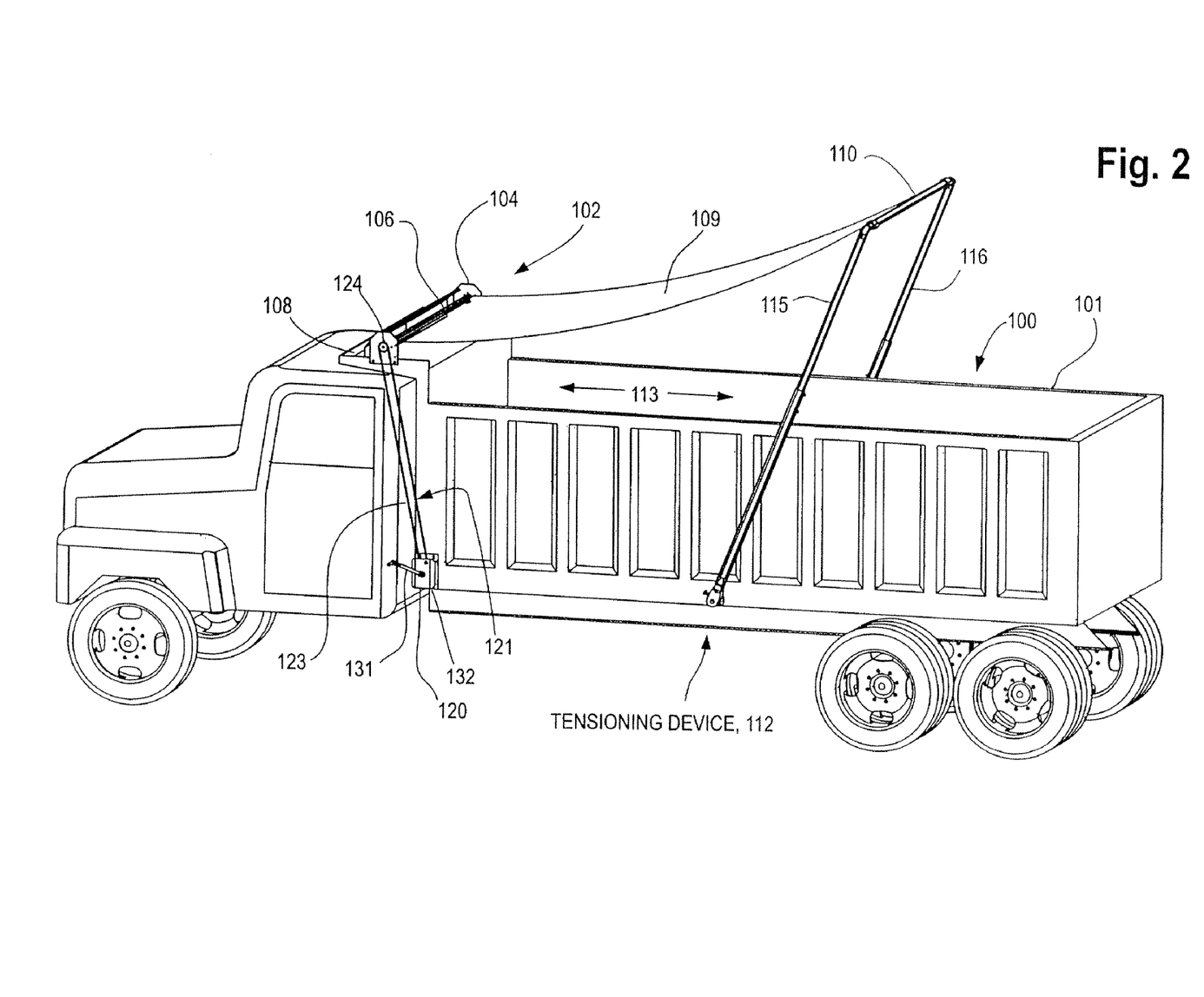
FIG. 2 is a perspective view of an open-top truck in accordance with an embodiment of the invention, illustrating a truck cargo container equipped with a covering apparatus in accordance with a preferred embodiment of the invention.

As shown in FIG. 2 with respect to a truck having a covering apparatus in accordance with an embodiment of the invention, the truck 100 is equipped with a conventional cargo container 101 and other conventional features. The truck 100 is equipped with a covering apparatus 102 that includes a roller housing 104 having a roller 106 that is mounted by a pair of bearings. The roller housing is generally connected to the cab shield 108 of the container 101. The apparatus includes a flexible, rollable cover 109 that has one end that is connected to the roller and another end that is connected to the crossbar 110 of a tensioning device 112 and that is provided to cover the open top 113 of the container 101. The cover is moveable between a fully rolled position and a fully unrolled position. The tensioning device 112 includes a pair of spaced apart, generally parallel pivoting arms 115, 116 that are connected to the container 101 (or, in other embodiments, to the chassis of the truck) and that urge the cover 109 towards its fully unrolled position. For instance, the tensioning device may be provided with one or more torsion springs, a spring-loaded counter-arm, or like mechanism (not shown). The arms 115, 116 are separated by a distance sufficient to clear the container 101 as the arms move along their path of travel between front and rear portions of the container. In other embodiments, the arms 115, 116 may also or alternatively be driven rearward via electrical or hydraulic drive mechanisms (not shown).

The covering apparatus includes a crank box 120 that, in the illustrated embodiment, is mounted to the container, and a chain drive 121. The chain drive 121 includes a chain 123 and a pair of sprocket wheels, one sprocket wheel 124 being coaxial with and operatively connected to the roller 106 and the other 125 (not shown in FIG. 1, but seen in FIG. 5) being operatively connected to a crankshaft 130. In other embodiments (not shown), such as covering apparatuses for smaller vehicles or stationary containers, the apparatus need not include a chain drive, and thus, for example, the crank shaft may be coaxial with the roller or may otherwise be coupled to the roller. As seen in FIG. 2, the crank handle 131 extends from the housing 132 of the crank box 120.

Figure 3:
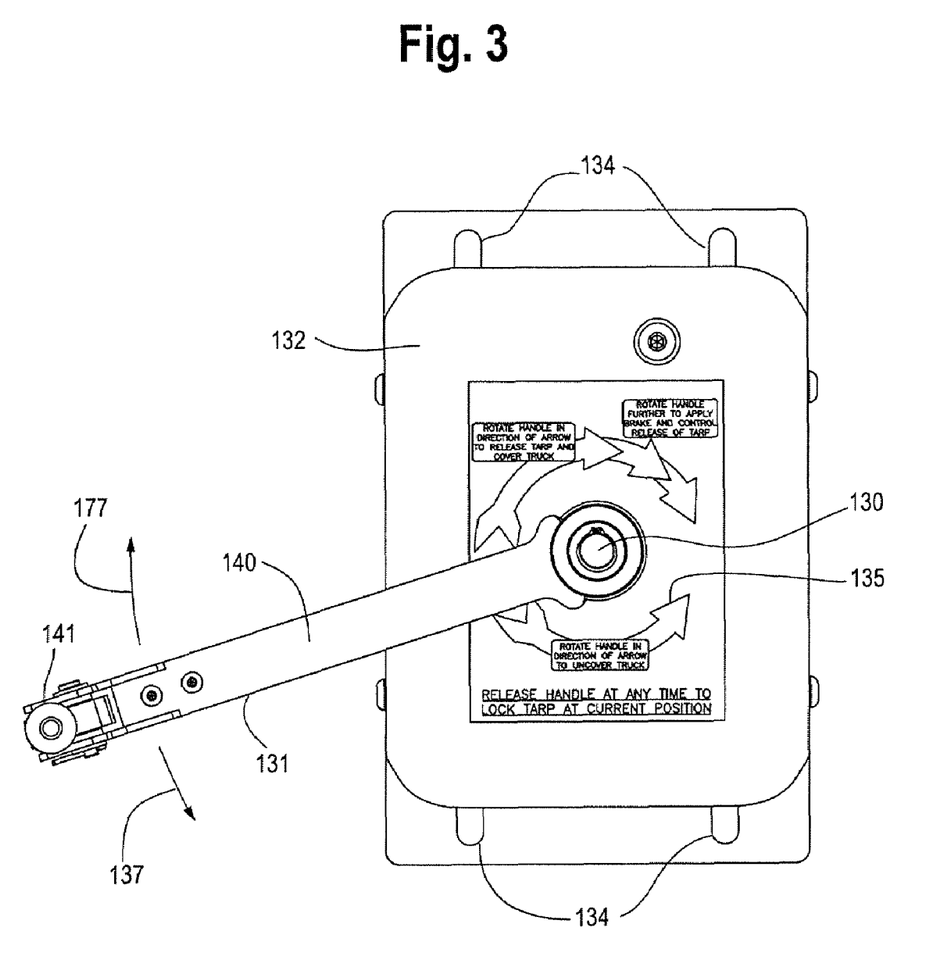
FIG. 3 is a front elevational view of the crank box housing and crank of the covering apparatus shown in FIG. 2.
Figure 4:
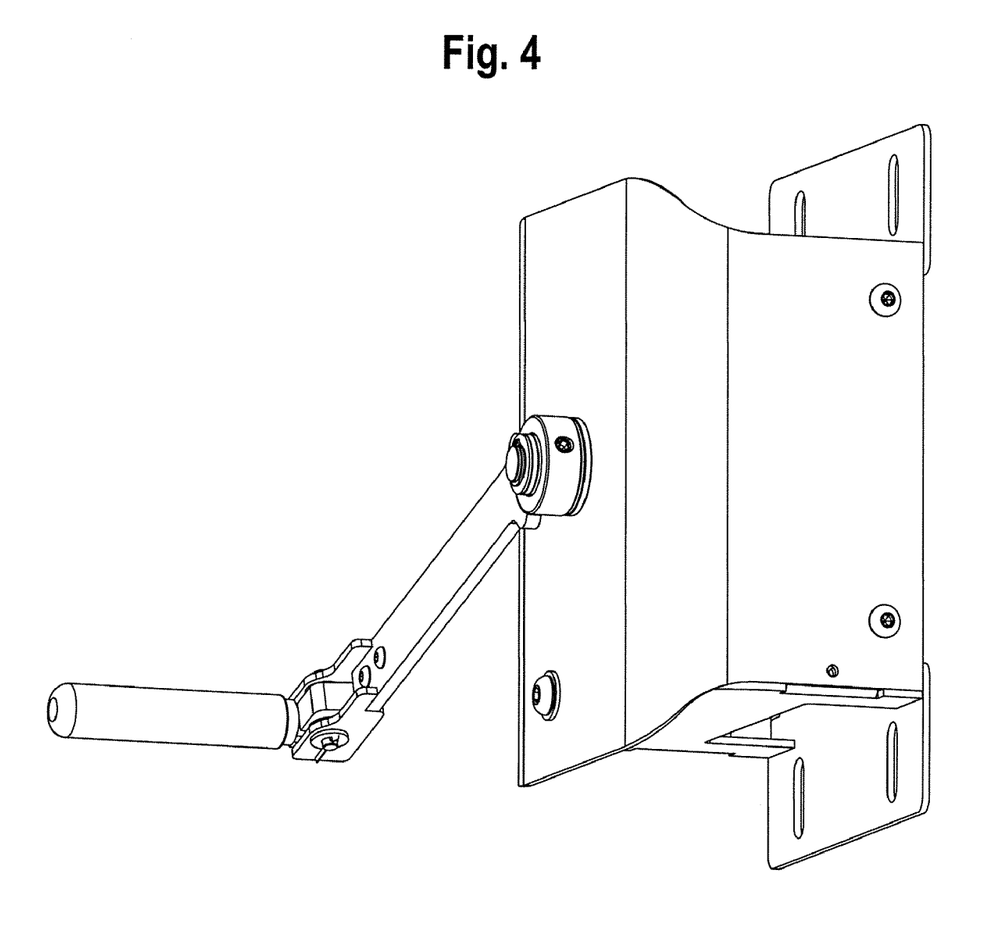
FIG. 4 is a side view of the crank box housing and crank shown in FIG. 3.

As illustrated in FIG. 3, the housing 132 is provided with installation holes 134 for mounting to the container with appropriate hardware. The housing 132 preferably is further provided with visual indicia 135 to instruct the operator as to the operation of the apparatus. As illustrated, counter-clockwise rotation of the crankshaft 130 with respect to the perspective of the operator (as provided by arrow 137) will cause rolling retraction of the cover (i.e., the truck container is uncovered), while clockwise rotation (arrow 177) of the crankshaft 130 will permit unrolling advancement of the cover over the top of the container (i.e., the truck container is covered). To permit rotation of the crankshaft 130, the crank 131 includes an arm portion 140 and a gripping portion 141.

Figure 5:
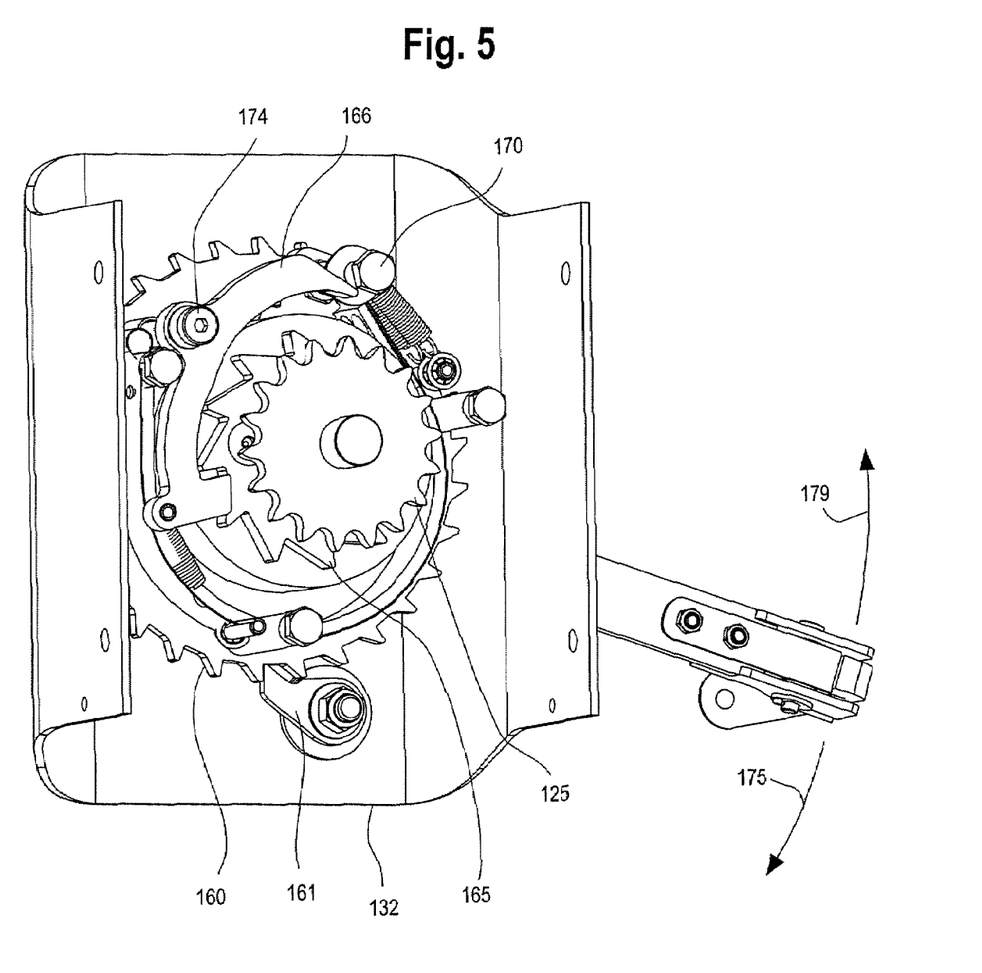
FIG. 5 is a rear view in perspective of the crank box housing shown in FIG. 3, shown with the rear cover of the housing removed.
Figure 6:
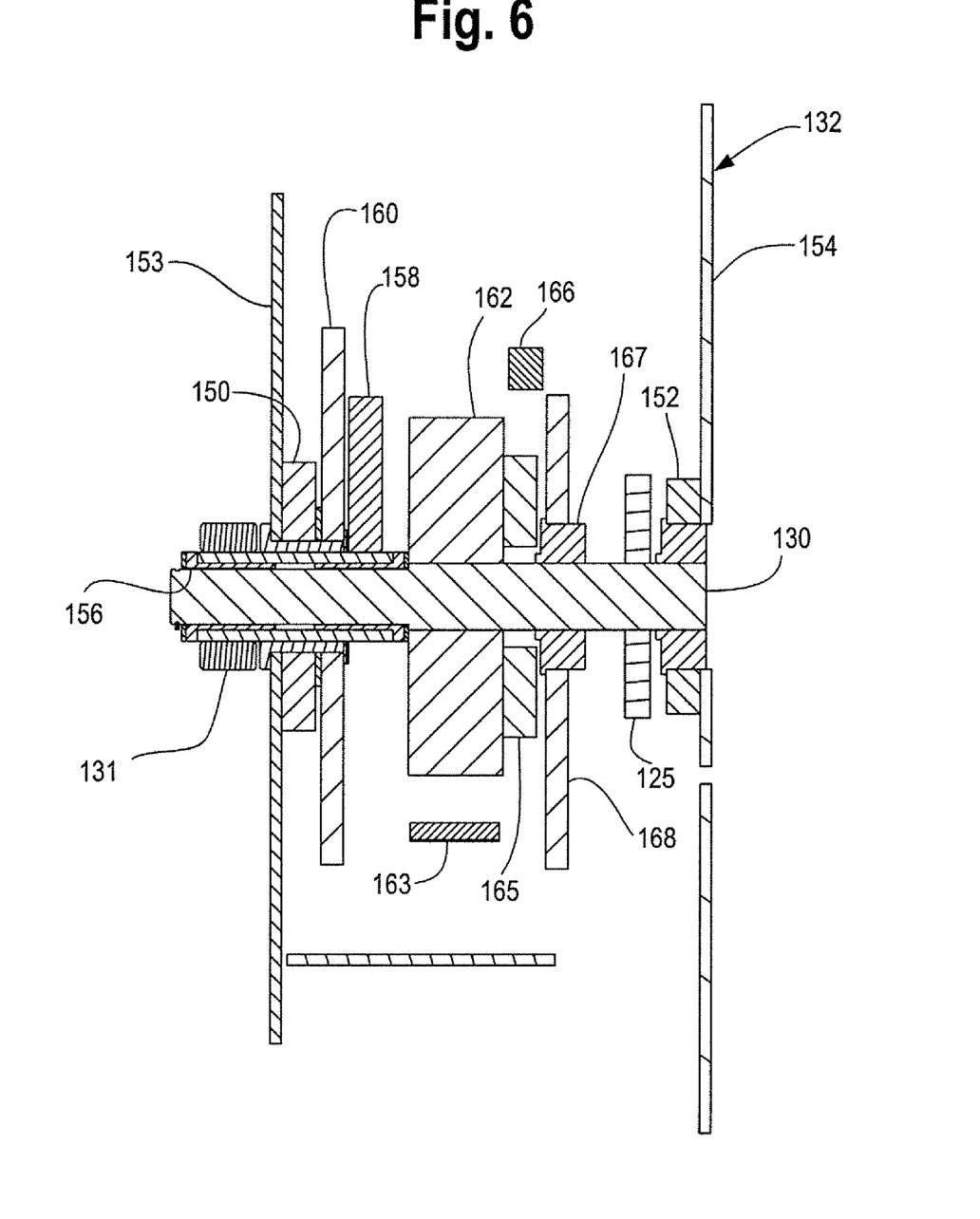
FIG. 6 is a cross sectional view of the crank box housing shown in FIG. 5, taken along a plane of the axis of the crankshaft.
Figure 7:
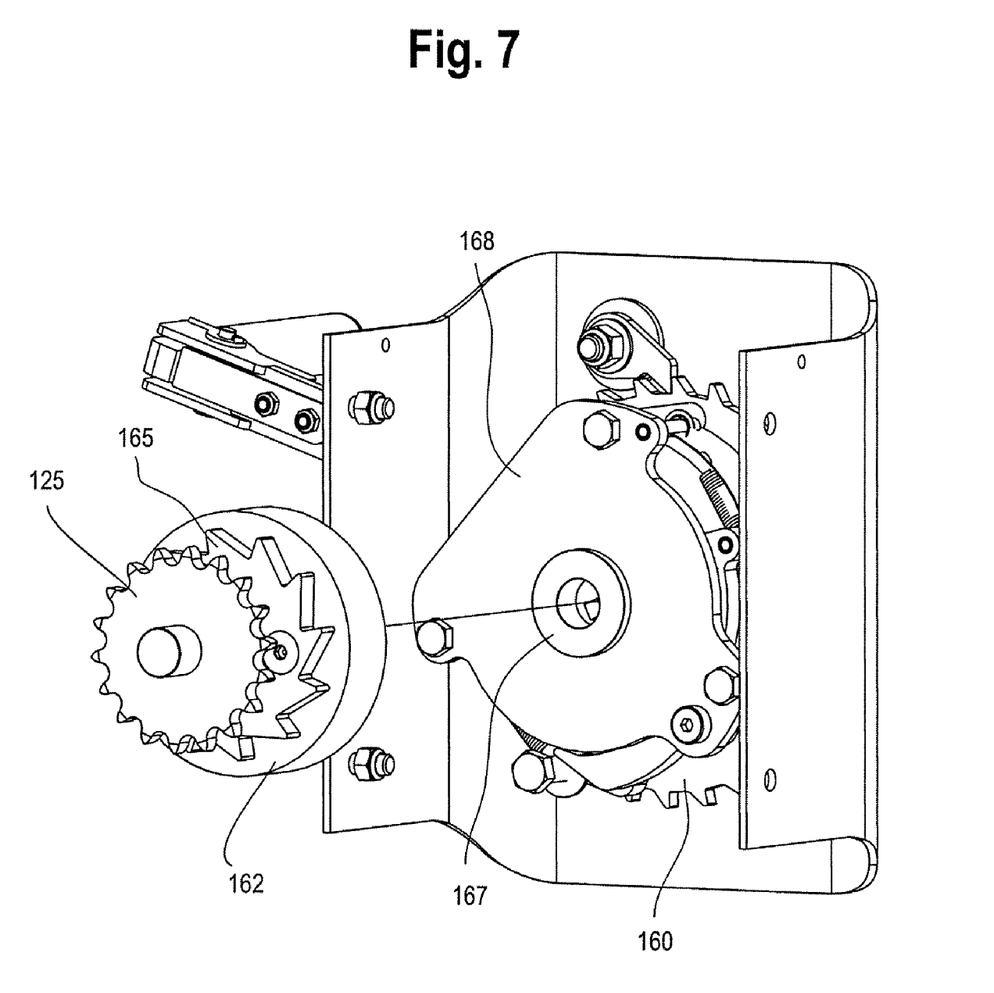
FIG. 7 is a partially exploded view of a portion of the crank box housing shown in FIG. 5.

The internal components of the crank housing 132 are best illustrated in FIGS. 5-8 and 13. With particular reference to FIG. 6, the housing 132 is provided with a flange 150 and a shaft bearing 152 which are affixed respectively to the front cover 153 and rear cover 154 of the housing. As shown, the shaft 130 does not engage the flange 150 but rotates with respect thereto within a sleeve bearing 156 connected to the handle 131. The sleeve bearing 156 is connected to an arm 158 which is releasably engageable with a ratchet wheel 160 as discussed in more detail below. The device further includes a pawl 161 (best shown in FIG. 5) that is spring-loaded and that is pivotally mounted to the housing 132. The device also includes a brake drum 162, a brake band 163 (better shown in FIG. 13) that is selectively engageable with the brake drum 162, a drive ratchet wheel 165, a drive pawl 166, a drive plate 168, that includes a plate flange 167 (shown in FIG. 7), and the heretofore mentioned sprocket wheel 125, all of which cooperate as described in more detail hereinbelow.

Figure 13:
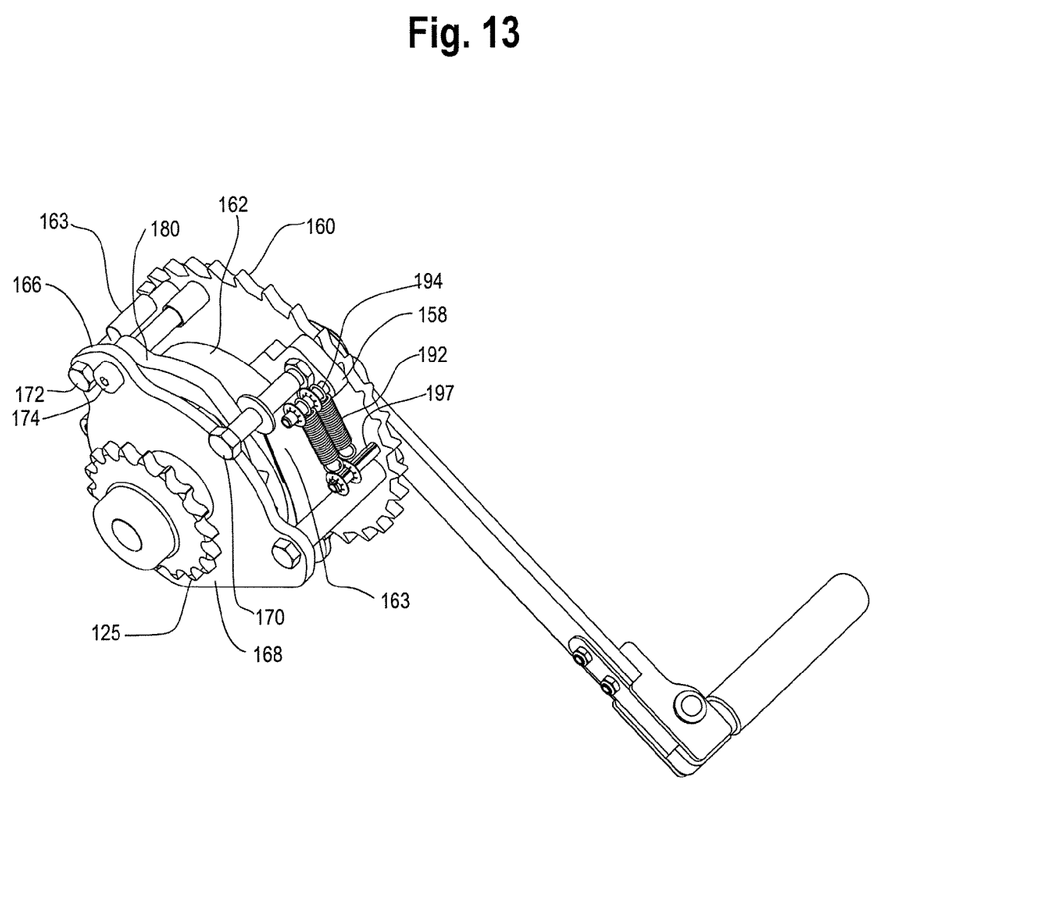
FIG. 13 is a perspective view of the drive and brake mechanisms disposed in the crank box illustrated in FIG. 2.
Figure 14:
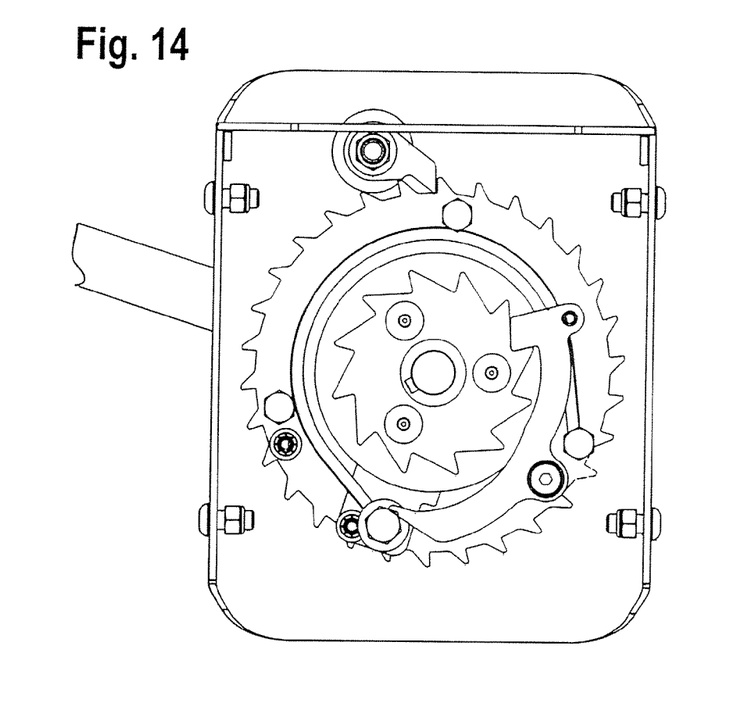
FIG. 14 is a rear elevational view of the crank box housing, illustrating the brake in a disengaged position.
Figure 15:
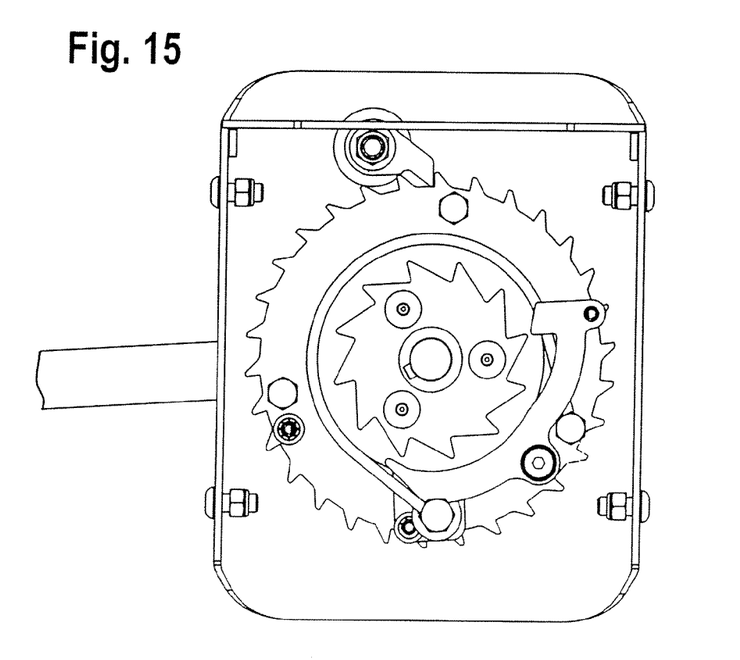
FIG. 15 is a rear elevational view of the crank box housing, illustrating the brake in an engaged position.

Also with reference to FIG. 6, the brake drum 162 and drive ratchet wheel 165 are secured to one another and are affixed to the crankshaft 130 and thus rotate with the crankshaft 130. Similarly, the sprocket wheel 125 is affixed to the crankshaft 130 and also rotates with the crankshaft 130. The flange 150 and bearing 152 are fixed with respect to the housing. The handle 131 is secured to the sleeve bearing 156, which is secured to the arm 158, thus causing the arm 158 to rotate about the shaft as the handle 131 is rotated. With reference to FIGS. 5 and 13, the arm 158 is connected to a first pin 170 on which is mounted one end of the brake band 163, the other end of the brake band 163 being connected to a second pin 172 that connects the ratchet wheel 160 and the plate 168.

In ordinary use, when the handle has been released by the operator, it is desired that the cover is maintained in a stationary position. To accomplish this, the pawl 161 engages the ratchet wheel 160 thereby forming a ratchet and pawl mechanism. This ratchet and pawl mechanism cooperates with a ratchet drive mechanism that comprises the drive pawl 166 that engages the drive ratchet wheel 165. The drive ratchet wheel 165 is affixed to the shaft 130, and accordingly rotation of the shaft 130 is prevented. As shown in FIGS. 5 and 13, the drive pawl 166 pivots on a pin 174 that connects the ratchet wheel 160 and plate 168. The drive pawl 166 normally engages the drive ratchet wheel 165.

Figure 8:
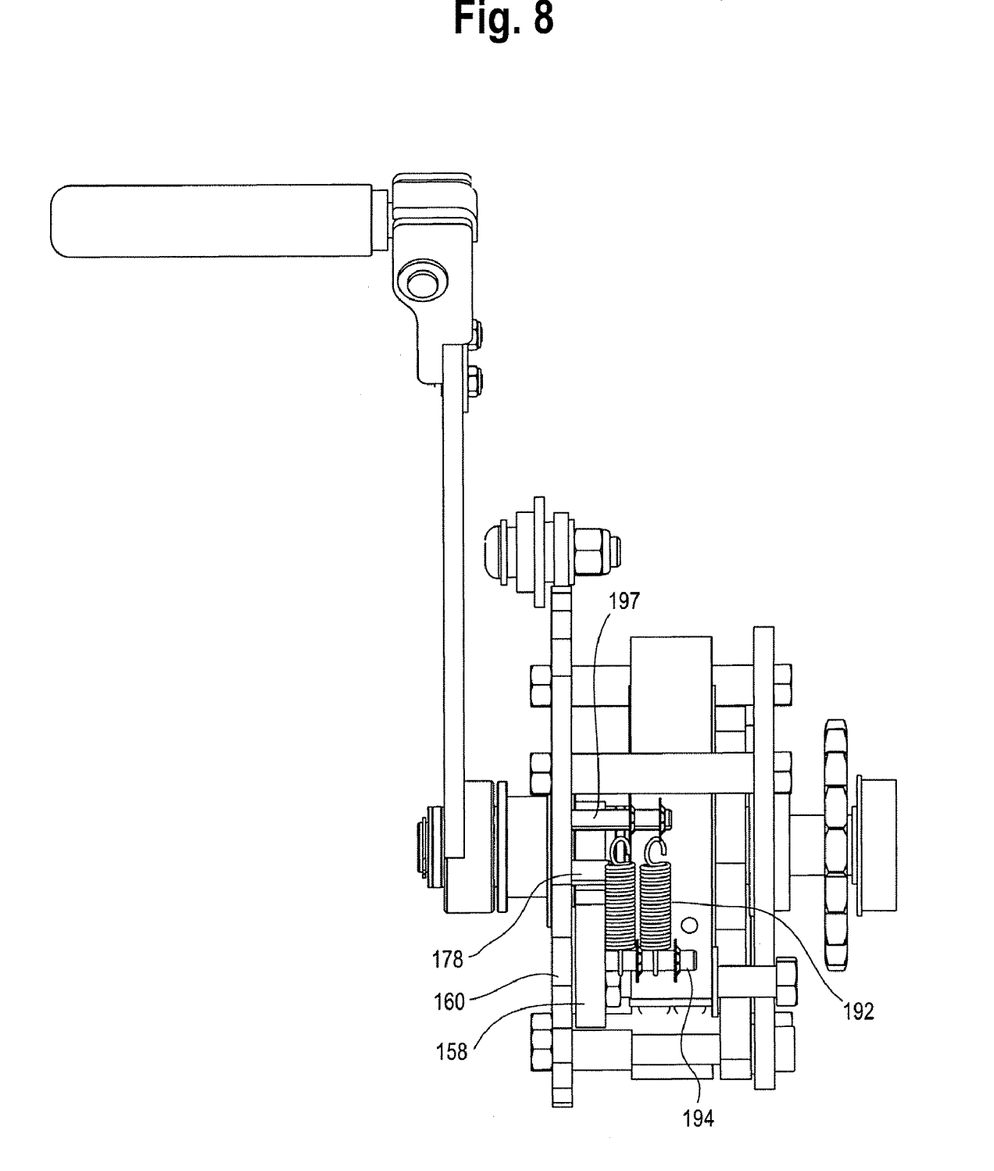
FIG. 8 is an elevation of the drive and brake mechanisms shown in FIG. 13.
Figure 9:
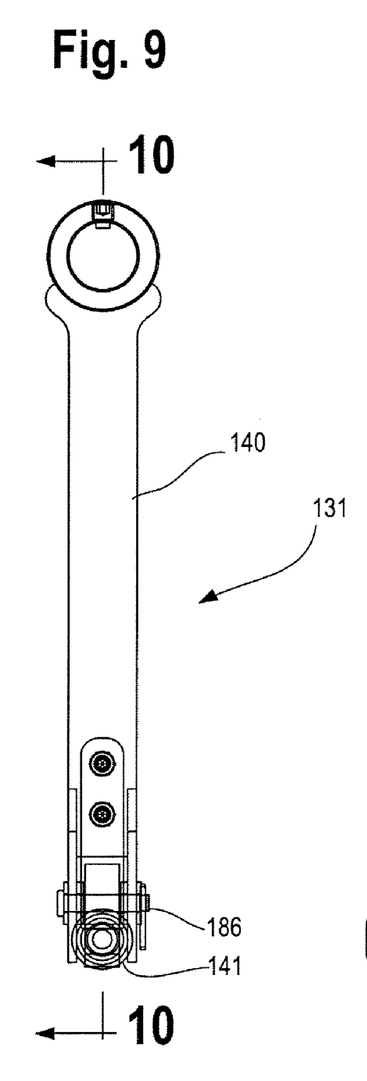
FIG. 9 is a perspective view of the crank handle, shown when the operator gripping portion of the handle is in an open position.

With respect to FIGS. 5 and 6, when the handle is turned in a counter-clockwise direction with respect to the user (shown by arrow 137 in FIG. 3 and by arrow 175 in FIG. 5), the arm 158 engages a pin 178 disposed on the ratchet wheel 160 (as best seen in FIG. 8) thereby causing the ratchet wheel 160 to rotate. The ratchet wheel 160 is connected to the plate 168, whereby rotation of the handle 131 causes rotation of the ratchet wheel 160 and plate 168 with respect to the housing and likewise causes the drive pawl 166 to bias the drive ratchet wheel 165. Because the drive ratchet wheel is affixed to the shaft and to the brake drum, which is likewise affixed to the shaft, the shaft will rotate and will cause rotation of the sprocket wheel 125. The sprocket wheel 125 drives chain 123 (not shown in FIGS. 5 and 6) that is operatively coupled to the roller 106, thereby causing the cover to spool about the roller. As shown in FIGS. 8 and 13, a pair of springs 192 is connected by loops to pins 194, 197 that are secured respectively to the arm 158 and ratchet wheel 160, thereby normally rotatably biasing the arm 158.

When it is desired to unroll the cover, the operator turns the handle 131 in the clock-wise direction (represented by arrow 177 in FIG. 3 and by arrow 179 in FIG. 5). The drive pawl 166 has a cam surface 180 (best shown in FIG. 13) that engages the pin 170 to cause the drive pawl 166 to pivot and to disengage from the drive ratchet wheel 165 thereby decoupling the drive ratchet wheel 165 from the drive pawl 166. The drive ratchet wheel 165, brake drum 162, and sprocket wheel 125, thus become free to rotate. Because the cover is tensioned by the tensioning mechanism (shown in FIG. 2), the cover will be caused to unroll to thereby cover the container.

If the operator turns the handle further in the clock-wise direction, the brake band 163 is caused to engage the brake drum 162, thereby frictionally retarding the rotation of the shaft and slowing the unrolling of the cover. The operator may control the amount of braking by adjusting the rotation of the handle.

Figure 10:
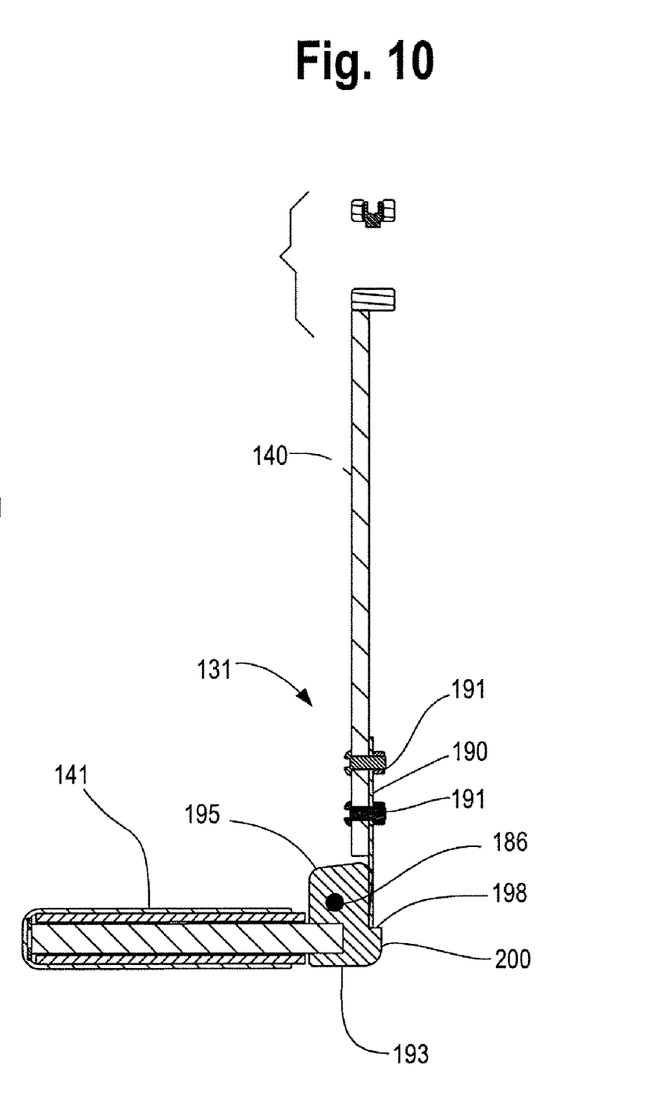
FIG. 10 is a cross sectional view taken in the plane of line 10-10 in FIG. 9.
Figure 11:
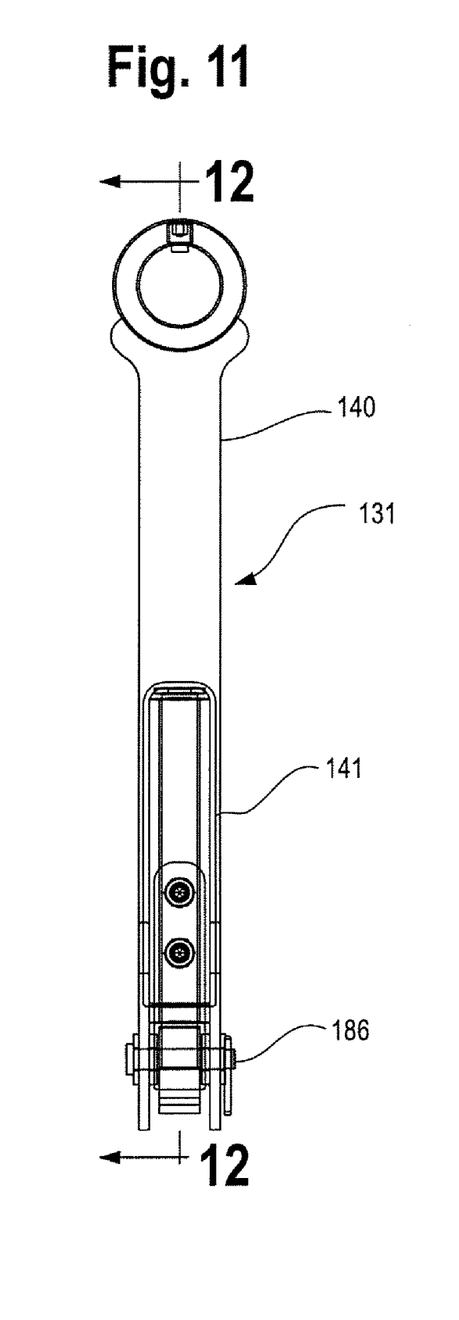
FIG. 11 is a perspective view of the crank handle, shown when the operator gripping portion of the handle is in a closed position.
Figure 12:
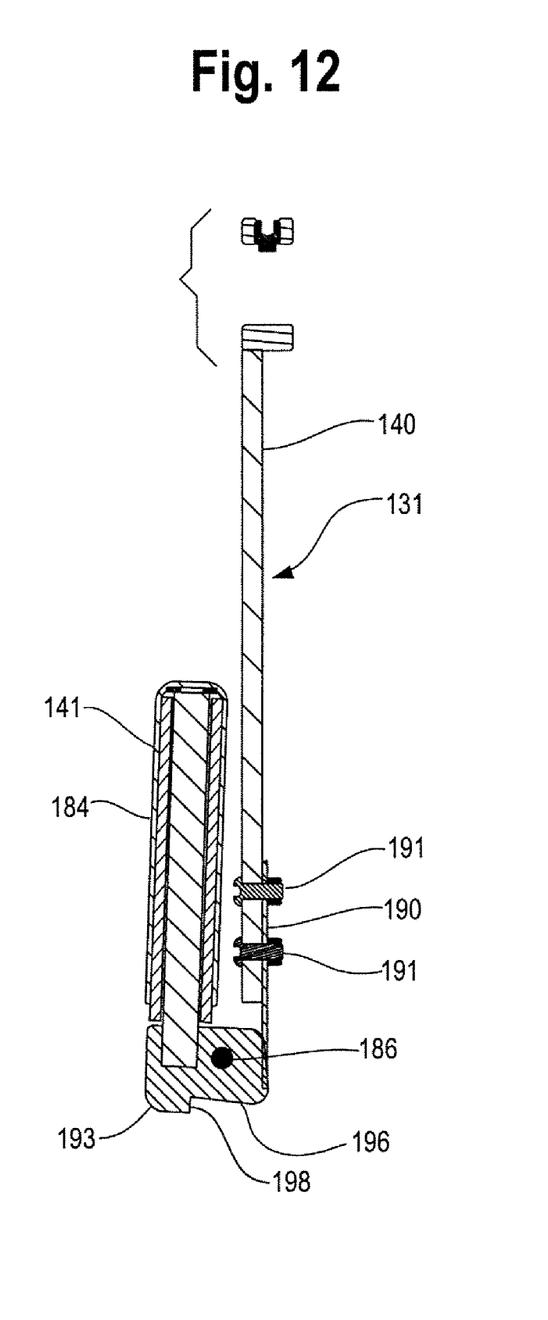
FIG. 12 is a cross sectional view taken in the plane of line 12-12 in FIG. 9.

With reference to FIGS. 9-12, a preferred embodiment of an operator gripping portion 141 of the handle 131 preferably includes a covering sleeve 184 (shown in FIG. 12) made of a soft material such as rubber or leather. Operator gripping portion 141 pivots about pivot pin 186 with respect to the arm portion 140. The arm portion 140 is provided with a plate spring 190 which is secured to the arm portion 140 via rivets or bolts 191. With reference to FIGS. 10 and 12, the operator gripping portion 141 terminates in cam portion 193 that includes a cam profile with a closed profile portion 195 and an open profile portion 196 and that further includes a stop 198. The spring and cam portion of the profile operate such that the spring biases the operator gripping portion either to the fully opened position shown in FIG. 10 (generally perpendicular to the arm portion 140) or the fully closed position shown in FIG. 12 (generally perpendicular to the arm portion 140) when the operator gripping portion is in an intermediate position (cam profile 200). The stop 198 engages the spring to prevent opening of the operator gripping portion beyond the fully opened position shown in FIG. 10.

The covering apparatus, container, and vehicle may be constructed of any suitable materials and may be assembled in any suitable fashion. For instance, the cover may be formed of a flexible material such as polyester, polypropylene, vinyl, canvas, or another suitable material. The crank box and associated components preferably are fashioned from steel. The brake band may be composed of semi-metallic strips having brass or another metal woven into a fabric, or may comprise any other suitable material, such as vermiculite-coated fiberglass fabric or carbon fiber fabric. The container and vehicle preferably are otherwise conventional. The vehicle illustrated in FIG. 2 is a dump truck hauling vehicle, but the invention is deemed suitable for use with any other open-top vehicle.

It is thus seen that the covering apparatus prepared in accordance with the invention permits one-handed operation allowing a user to roll and unroll a cover to respectively uncover and cover a container.

While particular embodiments of the invention have been described above, the invention is not limited thereto, and it is contemplated that numerous other embodiments within the scope of the appended claims are possible. For instance, the apparatus is useful on containers other than those illustrated herein. The description herein of preferred embodiments and of exemplary embodiments should not be construed as limiting the invention in scope. Similarly, no unclaimed language should be deemed to limit the invention in scope. The invention is deemed to be defined by the full scope of the following claims, including without limitation any equivalents that may be accorded under applicable law.

What is claimed is:

1. A container covering apparatus comprising:
a roller, said roller comprising a rotatable shaft;
a rollable cover having first and second opposing ends, said first end being connected to said roller, said roller being rotatable in a rolling direction and in an unrolling direction, said cover being moveable between a fully rolled position and a fully unrolled position; and
a crank assembly, said crank assembly comprising:
a crankshaft having an operator gripping portion connected thereto, said crankshaft being rotatable in a winding direction and an unwinding direction, said roller being operatively coupled to said crankshaft, whereby rotation of said crankshaft in said winding direction causes said roller to rotate in said rolling direction;
a releasable locking mechanism operatively connected to said crankshaft, said locking mechanism normally impeding rotation of said roller in the unwinding direction, said locking mechanism being releasable upon rotation of said crankshaft in said unwinding direction thereby permitting said roller to rotate in said unrolling direction; and
a releasable brake, said brake being engageable upon rotation of said crankshaft in said unwinding direction, said brake when engaged retarding rotation of said roller in said unrolling direction.

2. An apparatus according to claim 1, including a tensioning device operatively connected to said cover and biasing said cover to the fully unrolled position.

3. A covering apparatus according to claim 1, said crankshaft being rotatable in said unwinding direction to at least one position in which said locking mechanism is disengaged and wherein said brake is not engaged.

4. An apparatus according to claim 1, said crankshaft being coupled to said roller via a chain drive.

5. An apparatus according to claim 1, said locking mechanism comprising a ratchet gear coaxial with and rotating with said crankshaft, and a pawl normally engaging said ratchet gear and disengaging said ratchet gear upon rotation of said crankshaft in said unwinding direction.

6. An apparatus according to claim 1, the second end of said cover being connected to a bar, said apparatus including a tensioning device biasing said bar away from said roller.

7. An apparatus according to claim 1, said brake including a drum and a band, said drum being coaxial with said crankshaft and affixed thereto, said band being selectively engageable with said drum upon rotation of said crankshaft in said unwinding direction.

8. An apparatus according to claim 1, including a crank handle comprising an arm portion and a gripping portion, said gripping portion being moveable with respect to said arm portion over a range of travel between a first position generally parallel to said arm portion and a second position generally perpendicular to said arm portion, one of said arm portion and said gripping portion including a cam surface and the other of said arm portion and said gripping portion including a follower surface, said cam surface having a cam profile that cooperates with the follower surface to bias said gripping portion towards said first position or said second position when said gripping portion is in an intermediate position.

9. A container comprising a body having an open top and a covering apparatus, said covering apparatus comprising:
a roller, said roller being connected to said body, said roller comprising a rotatable shaft;
a rollable cover having first and second opposing ends, said first end being connected to said roller, said roller being rotatable in a rolling direction and in an unrolling direction, said cover being moveable between a fully rolled position and a fully unrolled position; and
a crank assembly, said crank assembly comprising:
a crankshaft having an operator gripping portion connected thereto, said crankshaft being rotatable in a winding direction and an unwinding direction, said roller being operatively coupled to said crankshaft, whereby rotation of said crankshaft in said winding direction causes rotation of said roller in said rolling direction;

a releasable locking mechanism operatively connected to said crankshaft, said locking mechanism normally impeding rotation of said roller in the unwinding direction, said locking mechanism being releasable upon rotation of said crankshaft in said unwinding direction thereby permitting said roller to rotate in said unrolling direction; and a releasable brake, said brake being engageable upon rotation of said crankshaft in said unwinding direction, said brake when engaged retarding rotation of said roller in said unrolling direction.

10. An apparatus according to claim 9, including a tensioning device operatively connected to said cover and biasing said cover to the fully unrolled position.

11. A vehicle comprising:

a container, said container comprising;

a body having an open top and a covering apparatus, said covering apparatus comprising:

a roller, said roller being connected to said body, said roller comprising a rotatable shaft;

a rollable cover having first and second opposing ends, said first end being connected to said roller, said roller being rotatable in a rolling direction and in an unrolling direction, said cover being moveable between a fully rolled position and a fully unrolled position; and a crank assembly, said crank assembly comprising:

a crankshaft having an operator gripping portion connected thereto, said crankshaft being rotatable in a winding direction and an unwinding direction, said roller being operatively coupled to said crankshaft, whereby rotation of said crankshaft in said winding direction causes rotation of said roller in said rolling direction;

a releasable locking mechanism operatively connected to said crankshaft, said locking mechanism normally impeding rotation of said roller in the unwinding direction, said locking mechanism being releasable upon rotation of said crankshaft in said unwinding direction thereby permitting said roller to rotate in said unrolling direction; and a releasable brake, said brake being engageable upon rotation of said crankshaft in said unwinding direction, said brake when engaged retarding rotation of said roller in said unrolling direction; and means for transporting said container.

12. A vehicle according to claim 11, said vehicle comprising an open-top truck.

* * * * *